3,239,504
CERTAIN N-ARYL DERIVATIVES OF 3-AZA-BICYCLO[3.2.2]NONANE

Vada L. Brown, Jr. and Theodore E. Stanin, Kingsport, Tenn., assignors to Eastman Kodak Company, Rochester, N.Y., a corporation of New Jersey
No Drawing. Filed Aug. 20, 1962, Ser. No. 218,158
2 Claims. (Cl. 260—239)

This invention relates to new chemical compounds and more particluarly to novel N-substituted nitrile derivatives of 3-azabicyclo[3.2.2]nonane and to novel derivatives of such nitriles.

The synthesis of 3-azabicyclo[3.3.2]nonane is described in the patent application of Brown, Smith and Stanin, Serial No. 82,373, filed January 13, 1961, now abandoned, and in the continuation-in-part thereof, Serial No. 196,494, filed May 21, 1962. The compound can be prepared by the catalytic deamination of 1,4-cyclohexanebis (methylamine) in vapor phase. The procedure comprises feeding 1,4-cyclohexanebis(methylamine) with nitrogen at a constant rate through a heated catalyst bed, e.g., catalytic alumina, at a temperature of 350 to 450° C.

The compounds of the invention include N-nitrile substituted derivatives (I) of 3-azabicyclo[3.2.2]nonane and related novel N-substituted compounds (II) and (III) derived from such nitriles. These compounds are represented by the following formulae:

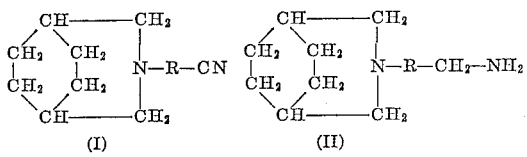

(I) and (II)

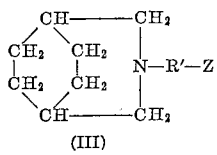

(III)

wherein R is an alkylene radical and R′ is an arylene radical. The radical R can be any straight or branched chain alkylene radical having, for example, about 1 to 8 carbon atoms. Preferably R is a lower alkylene radical having from about 1 to 4 carbon atoms. R′ is most suitably a mononuclear arylene radical, such as the phenylene radical or a substituted phenylene radical having one or more substituents, which substituents are compatible with the intended uses of the product. Preferably such substituents are hydrocarbon radicals such as lower alkyl radicals, e.g., of 1 to 4 carbon atoms. In compounds of type (III) the radical Z is a nitro (—NO$_2$) or amino (—NH$_2$) radical.

Compounds within the scope of the invention also include quaternary ammonium derivatives of the novel compounds of types (I), (II) and (II) and derivatives obtained by N-substitution of the primary amino group of the type (II) and (III) compounds.

The nitrile compounds (I) of the invention can be prepared by the reaction of 3-azabicyclo[3.2.2]nonane with an α-, β-unsaturated aliphatic nitrile such as acrylonitrile or methacrylonitrile. They can also be prepared by the reaction of 3-azabicyclo[3.2.2]nonane with a halogen-substituted aliphatic nitrile such as chloroacetonitrile, α- or β-chloropropionitrile, α-, β- or γ-chlorobutyronitrile and the like. The reaction is carried out by mixing the reactants in approximately equimolar proportions, preferably in the presence of an inert solvent, with stirring and preferably with mild heating until the reaction is substantially complete. The product of type (I) obtained will have a nitrile radical, —R—CN, of the same number of carbon atoms as the unsaturated nitrile or halogen-substituted aliphatic nitrile used as a reactant.

Another suitable method for preparing a nitrile compound of the invention comprises the aldehyde-bisulfite reaction of 3-azabicyclo[3.2.2]nonane, with formaldehyde, sodium bisulfite and potassium cyanide. The reaction can be carried out by forming an aqueous solution of formaldehyde, with sodium bisulfite, then adding 3-azabicyclo[3.2.2]nonane and finally potassium cyanide. In the resulting nitrile product the alkylene radical R will be methylene.

The amino-substituted compounds (II) of the invention are prepared by hydrogenation of the nitriles of type (I), preferably by reduction of the nitrile with a complex metal hydride such as lithium aluminum hydride, potassium borohydride or sodium borohydride. A suitable procedure comprises forming a suspension of the metal hydride in ether and adding the nitrile derivative of 3-azabicyclo[3.2.2]nonane to the suspension while heating under reflux.

The preparation of compounds of the invention is illustrated by the following examples. Examples 1 to 3 illustrate the preparation of typical nitrile compounds of type (I).

Example 1

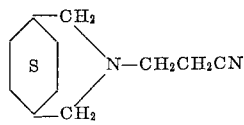

3-azabicyclo[3.2.2]nonane-3-propionitrile

*Procedure.*—A solution of 50 g. (0.4 g.) 3-azabicyclo [3.2.2]nonane in 150 cc. of tertiary butyl alcohol was charged to a one liter, 3-neck flask equipped with stirrer, condenser, thermometer, addition funnel and cooling bath. To this stirred solution was added 21.2 g. (0.4 mole) acrylonitrile over a seven-minute period. The temperature rose from 24° C. to 42° C. during the addition. The reaction mixture was stirred for six hours without heating or cooling. After removal of the tertiary butyl alcohol by distillation, there was obtained 56.2 (86 percent) of 3-azabicyclo[3.2.2]nonane-3-propionitrile, B.P. 84–86° C. (0.1 mm.).

*Analysis.*—Calcd. for N: 15.73%. Found: 15.38%. $n_D^{20}$ 1.5004; F.P. +26° C.

Example 2

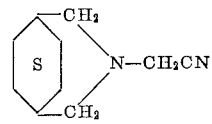

3-azabicyclo[3.2.2]nonane-3-acetonitrile

*Procedure.*—Chloroacetonitrile (75.5 g.; 1.0 mole) and sodium carbonate (53 g.; 0.5 mole) in 450 ml. of dry benzene was placed in a three-liter, three-neck flask, equipped with stirrer, thermometer, condenser, and addition funnel. To this rapidly stirred suspension was added 125 g. (1.0 mole) of 3-azabicyclo[3.2.2]nonane in 200 ml. of dry benzene. The temperature rose from 39° C. to 65° C. during this addition. After the addition had been completed, the reaction mixture was heated, with stirring, to reflux for four hours. The reaction mixture was then cooled, filtered, concentrated in vacuo, and fractionated to yield 126.6 g. (77 percent) of 3-azabicyclo[3.2.2]nonane-3-acetonitrile, B.P. 80° C. (0.2 mm.).

*Analysis.*—Calcd. for C: 73.18%; N, 17.07. Found: C, 73.08%; N, 17.11; F.P. +51–53° C.

Example 3

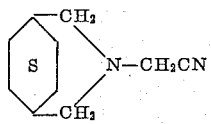

3-azabicyclo[3.2.2]nonane-3-acetonitrile

*Procedure.*—An aqueous solution of formaldehyde (81 g.; 1.0 mole of 37 percent solution) was charged to a one liter, three-neck flask, equipped with a stirrer, condenser, thermometer, addition funnel and cooling bath. Sodium metabisulfite (97.2 g., 0.51 mole) in water was added to the stirred formaldehyde solution which maintaining the reaction temperature below 25° C. After the addition of the sodium metabisulfite had been completed, the reaction mixture was warmed to room temperature, and then 125 g. (1.0 mole) of 3-azabicyclo[3.2.2]nonane was added. To the resulting slurry was added 65.1 g. (1.0 mole) of potassium cyanide in 100 ml. of water. Stirring was continued for one hour after which time stirring was discontinued. The oil layer which formed was removed and distilled in vacuo to yield 96.5 g. (58 percent) 3-azabicyclo[3.2.2]nonane-3-acetonitrile, B.P. 104° C. (2.0 mm.). The yield of this reaction might be improved by the use of equimolar quantities of sodium metabisulfite.

The next example describes the preparation of a typical amino compound (II) of the invention by reduction of the type of nitrile prepared in Examples 2 and 3.

Example 4

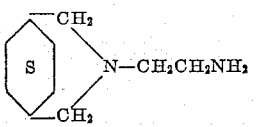

3-azabicyclo[3.2.2]nonane-3-ethylamine

*Procedure.*—To a stirred suspension of 28.5 g. (0.715 mole) lithium aluminum hydride in one liter of ether was added 82 g. (0.5 mole) 3-azabicyclo[3.2.2]nonane-3-acetonitrile at such a rate as to maintain a very slight reflux (required 30 minutes). After the addition had been completed, the reaction mixture was refluxed for three hours and then allowed to stand overnight at room temperature. The excess lithium aluminum hydride was decomposed. The reaction mixture was filtered, the solid washed with ether, and the filtrate and wash combined. The material was concentrated and the residual oil was fractionated to yield 74.4 g. (88.5 percent) of 3-azabicyclo[3.2.2]nonane-3-ethylamine, B.P. 97–98° C. (1.5–1.7 mm).

*Analysis.*—Calcd. for C: 71.45%; N, 16.67%. Found: C, 71.01%; N, 16.39%. $n_D^{20}$ 1.5050.

The product of Example 4 reacts with carbon dioxide of the air very rapidly.

The next example illustrates the preparation of a novel substitution product of the amino compounds (II) of the invention, the product being a quaternary ammonium salt of a derivative of a type (II) compound, such derivative being N-substituted on the primary amino group and the substituent being a guanyl radical, $-C(:NH)NH_2$.

Example 5

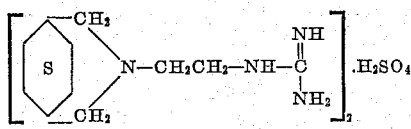

2-(3-azabicyclo[3.2.2]non-3-yl)ethylguanidine sulfate

*Procedure.*—2-methyl-2-thiopseudourea sulfate,
$(NH_2C:NHSCH_3)_2 \cdot H_2SO_4$
(27.8 g., 0.1 mole) was added to 33.6 g. (0.2 mole) of 3-azabicyclo[3.2.2]nonane-3-ethylamine in 100 cc. of water and the resulting mixture refluxed for seven and one-half hours. During this reflux period the vigorous evolution of methyl mercaptan ensued. The reaction mixture was cooled and the solid collected by filtration to yield 42.9 g. (82.7 percent) of guanidine [2-(3-azabicyclo[3.2.2]non-3-yl)ethyl]-, sulfate. After recrystallization from isopropyl alcohol-water, the material melted at 150° C. with decomposition.

*Analysis.*—Calcd. for C; 50.97%; N, 21.62%; S, 6.19%. Found: C, 50.82%; N, 21.31%; S, 6.16%.

Example 6 describes the preparation of a compound of type (III) wherein R' is an arylene radical and Z is $-NO_2$, such compound being useful as an intermediate for preparation of the corresponding amino compound in which Z is $-NH_2$ as illustrated by Example 7.

Example 6

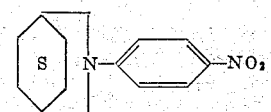

3-(p-nitrophenyl)-3-azabicyclo[3.2.2]nonane

*Procedure.*—To a single neck one liter flask equipped with a reflux condenser was added 127 g. (1.02 moles) 3-azabicyclo[3.2.2]nonane, 78.8 g. (0.5 mole) 1-chloro-4-nitrobenzene and 300 g. of n-butyl alcohol. The reaction mixture was heated under reflux for 20½ hours. The resulting mixture was concentrated in vacuo to remove the solvent. The residue was dispersed in 300 ml. of water and the solid collected by filtration. The solid was then treated once with 400 ml. concentrated hydrochloric acid and then diluted with an equal volume of water. This solution was then made strongly alkaline with sodium hydroxide. The solid was collected by filtration to yield 106.5 g. (86.5%) of crude bright yellow 3-(p-nitrophenyl)-3-azabicyclo[3.2.2]nonane, M.P. 148–153° C. after recrystallization from isopropyl alcohol.

*Analysis.*—Calcd. for $C_{14}H_{18}N_2O_2$. C, 68.31%; H, 7.31%; N, 11.38%. Found: C, 68.26%; H, 7.38%; N, 11.37%.

Example 7

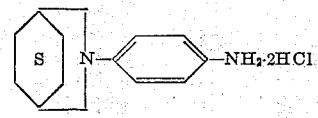

3-(p-aminophenyl)-3-azabicyclo[3.2.2]nonane

*Procedure.*—An autoclave was charged with 16 g. (0.065 mole) of 3-azabicyclo[3.2.2]nonane-3-(p-nitrophenyl) as prepared in Example 6, 250 ml. of isopropyl alcohol, and 10 g. of alcoholic Raney nickel. Hydrogenation was carried out at 30 to 50° C. at 800–900 p.s.i. hydrogen pressure. The product which was discharged from the autoclave was water white, but upon standing for 2 hours, the solution was purple. The reaction product was filtered to remove the catalyst. The filtrate was made strongly acid with concentrated aqueous hydrochloric acid, then evaporated to near dryness on a steam bath. The resulting paste was recrystallized from aqueous isopropyl alcohol to yield 12.1 g. (64.5%) of 3-(p-aminophenyl-3-azabicyclo[3.2.2]nonane hydrochloride, M.P. 190 to 200° C. with decomposition and sublimation.

The amino compounds (II), when quaternized with methyl or ethyl sulfate, an alkyl halide or the like, also have utility as mordants for use in the receiving sheet in dye transfer photographic processes. The amino compounds (III), wherein R' is a phenylene or substituted phenylene group and Z is $-NH_2$, such as illustrated by Example 7 are useful in the form of quaternary salts, e.g., the hydrochloride, as developing agents for photographic silver halide emulsions developed in the presence of couplers for forming cyan, magenta and yellow dyes.

The principal utility of the nitrile and nitro compounds of the invention is the use as intermediates in preparation of the novel amine derivatives of the invention. The latter compounds of type (II) have pharmaceutical utility, particularly in pharmaceutical research and as pharmaceutical intermediates. Such compounds and their derivatives have potentially valuable utility as analgesics or as anti-hypertensive agents.

The amino compounds (II) and (III) of the invention are used most conveniently as pharmaceuticals in the form of water soluble, non-toxic quaternary ammonium salts and such salts, as exemplified by the products of Examples 5 and 7 are within the scope of the invention. These include acid addition salts prepared from acids which produce salts whose anions are relatively innocuous to animal organisms in therapeutic doses of the salts. Suitable acid addition sales include those derived from mineral acids such as hydrochloric, hydrobromic, hydriodic, nitric, phosphoric and sulfuric acid and organic acids such as acetic, citric, tartaric and lactic acids and the like. Such acids produce the hydrochloride, hydrobromide, hydriodide, nitrate, phosphate or acid phosphate, sulfate or bisulfate, acetate, citrate or acid citrate, tartrate or bitartrate, and lactate salts, respectively.

The invention has been described in considerable detail with particular reference to certain preferred embodiments thereof, but it will be understood that variations and modifications can be effected within the spirit and scope of the invention as described hereinabove, and as defined in the appended claims.

We claim:
1. 3-(p-nitrophenyl)-3-azabicyclo[3.2.2]nonane.
2. 3-(p-aminophenyl)-3-azabicyclo[3.2.2]nonane.

References Cited by the Examiner
UNITED STATES PATENTS 3,078,272   2/1963   Mull _____ 260—239

OTHER REFERENCES

Blanton et al., J. Pharm. Sciences, vol. 51, pages 878–881 (1962).

Chemical and Engineering News, vol. 39, January 23, 1961, page 13.

Krieger, Index Chemicus, vol 8, Abstract No. 25432 (1963).

Najer et al., Bull. Soc. Chim. France, 1962 (8–9), pp. 1593–7.

Smith et al., J. Org. Chem., vol. 26, pp. 5145–5149 (1961).

Wollweber et al., Chem. Abstracts, vol. 57, pp. 16561–2 (1962).

HENRY R. JILES, *Acting Primary Examiner.*
ALTON D. ROLLINS, J. T. MILLER,
*Assistant Examiners.*